(12) United States Patent
Liu et al.

(10) Patent No.: US 6,288,332 B1
(45) Date of Patent: Sep. 11, 2001

(54) COMPONENT SUPPORT FRAME

(75) Inventors: Alvin Liu, Pa-Li; Yu-Tai Liu, Hsin-Chuang, both of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/340,978

(22) Filed: Jun. 28, 1999

(30) Foreign Application Priority Data

Oct. 17, 1998 (TW) ............................................. 87217148 U

(51) Int. Cl.[7] ................. H02G 3/08; H05K 5/00
(52) U.S. Cl. .................. 174/52.1; 361/683; 361/725; 312/223.2
(58) Field of Search ................ 174/52.1, 35 R; 361/683, 679, 725; 312/223.2

(56) References Cited

U.S. PATENT DOCUMENTS 5,777,848 * 8/2000 McAnally et al. .................... 361/725
6,000,767 * 12/1999 Liu et al. .......................... 312/223.2
6,097,591 * 8/2000 Ircha .................................. 361/683

* cited by examiner

*Primary Examiner*—Dean A. Reichard
*Assistant Examiner*—Hung V Ngo
(74) *Attorney, Agent, or Firm*—Wei Te Chung

(57) ABSTRACT

A component support frame retains a power supply in a computer enclosure. The component support frame includes a U-shaped receptacle for receiving the power supply therein. Pawls are formed in the receptacle for engaging with and retaining the power supply. A pair of spaced first lugs is formed on the component support frame and defines aligned holes for receiving a pivot pin. The pivot pin is rotatably received in aligned holes defined in second lugs formed on the enclosure thereby pivotally attaching the component support frame to the enclosure. A grasping tab is formed on the receptacle for facilitating manual movement of the component support frame between a retracted position where the power supply is received in the enclosure and an extended position where the power supply is at least partially exposed for facilitating maintenance and repair.

14 Claims, 6 Drawing Sheets

COMPONENT SUPPORT FRAME

BACKGROUND OF THE INVENTION

1. Field of the Invention

The present invention generally relates to a frame for supporting a component in an enclosure of an electronic device, and in particular to a frame for movably supporting a component in an enclosure.

2. The Prior Art

Electronic devices, such as a personal computer, of reduced size and increased functional capability are very popular. The modern trend of miniaturization requires manufacturers to arrange components of an electronic device in a more compact fashion within a limited space. Such a compact organization of the component complicates maintenance and repair of the electronic device. Mounting the component in a movable fashion provides a measure to overcome the space problem, such as the disclosure of Taiwan Patent Application No. 84213528. Sliding rails are provided on a bottom surface of a component, such as a power supply, for movably retaining the power supply in an enclosure. The space problem is addressed but costs are increased.

Another example is disclosed in Taiwan Patent Application No. 86213339 as shown in FIG. 1 of the attached drawings. A computer enclosure 400 comprises a top plate 100 and a rear plate 200. A support frame 300 is fixed to the top and rear plates 100, 200 for supporting a power supply (not shown). The support frame 300 has a top panel (not labeled) on which pawls 320 are formed for engaging with openings 110 defined in the top plate 100. A rear panel (not labeled) of the support frame 300 forms a side flange 310 abutting against a flange 210 of the rear plate 200. A bolt 330 secures the side flange 310 of the support frame 300 to the flange 210 of the rear plate 200 of the enclosure 400. The power supply may be removed from the enclosure 400 by simply detaching the support frame 300 from the enclosure 400 and a free space is formed in the enclosure 400. However, the top plate 100 must be detached from the enclosure 400 first in order to remove the support frame 300. Furthermore, the support frame 300 may not provide a sufficient supporting force for supporting a heavy component.

It is thus desired to provide a component support frame for movably retaining a component in an electronic device to overcome the problems discussed above.

SUMMARY OF THE INVENTION

Accordingly, an object of the present invention is to provide a component support frame for movably retaining a component of an electronic device in an enclosure thereof thereby allowing the component to be readily moved out of the enclosure for maintenance and repair purposes.

Another object of the present invention is to provide a component support frame having a simple structure for supporting a component of an electronic device in an enclosure thereof.

To achieve the above objects, in accordance with the present invention, a component support frame retains a power supply in a computer enclosure. The component support frame comprises a U-shaped receptacle for receiving the power supply. Pawls are formed in the receptacle for engaging with and retaining the power supply. A pair of spaced first lugs is formed on the component support frame and defines aligned holes for receiving a pivot pin. The pivot pin is rotatably received in aligned holes defined in second lugs formed on the enclosure thereby pivotally attaching the component support frame to the enclosure. A grasping tab is formed on the receptacle for facilitating manual movement of the component support frame between a retracted position where the power supply is received in the enclosure and an extended position where the power supply is at least partially exposed for facilitating maintenance and repair.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
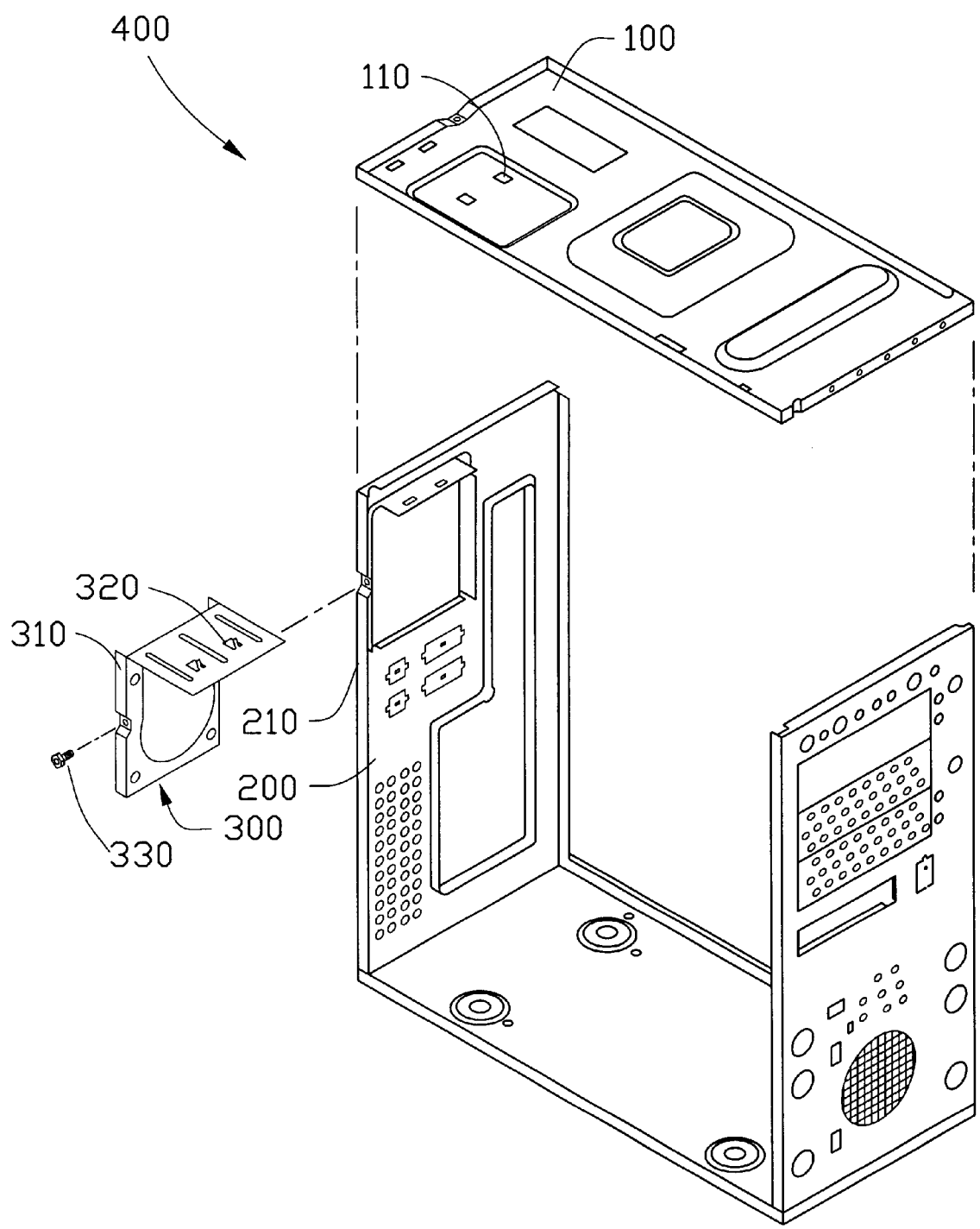
FIG. 1 is an exploded view of a conventional computer enclosure.
Figure 2:
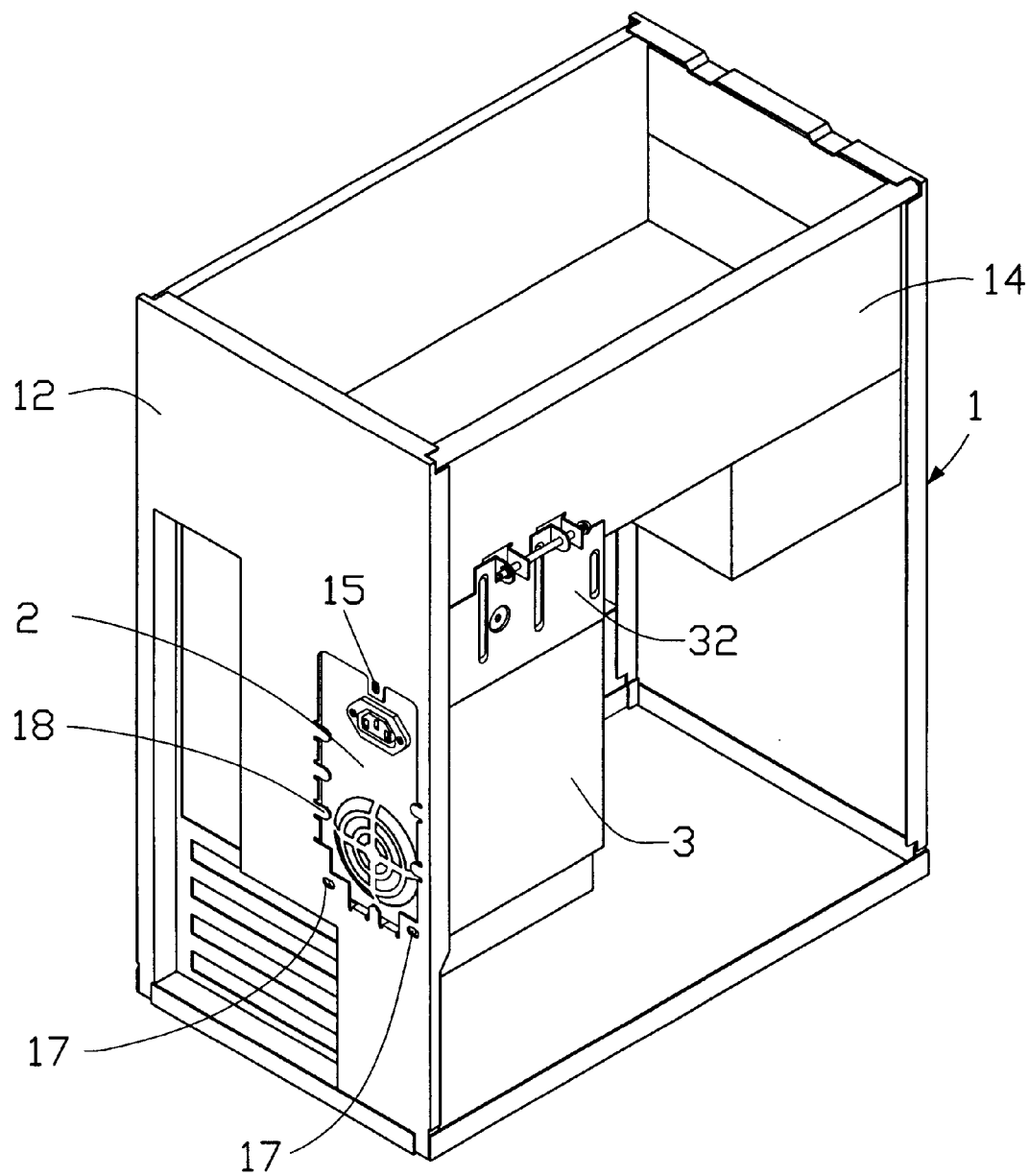
FIG. 2 is a perspective view of a computer enclosure in which a power supply is retained by a component support frame constructed in accordance with the present invention.
Figure 3:
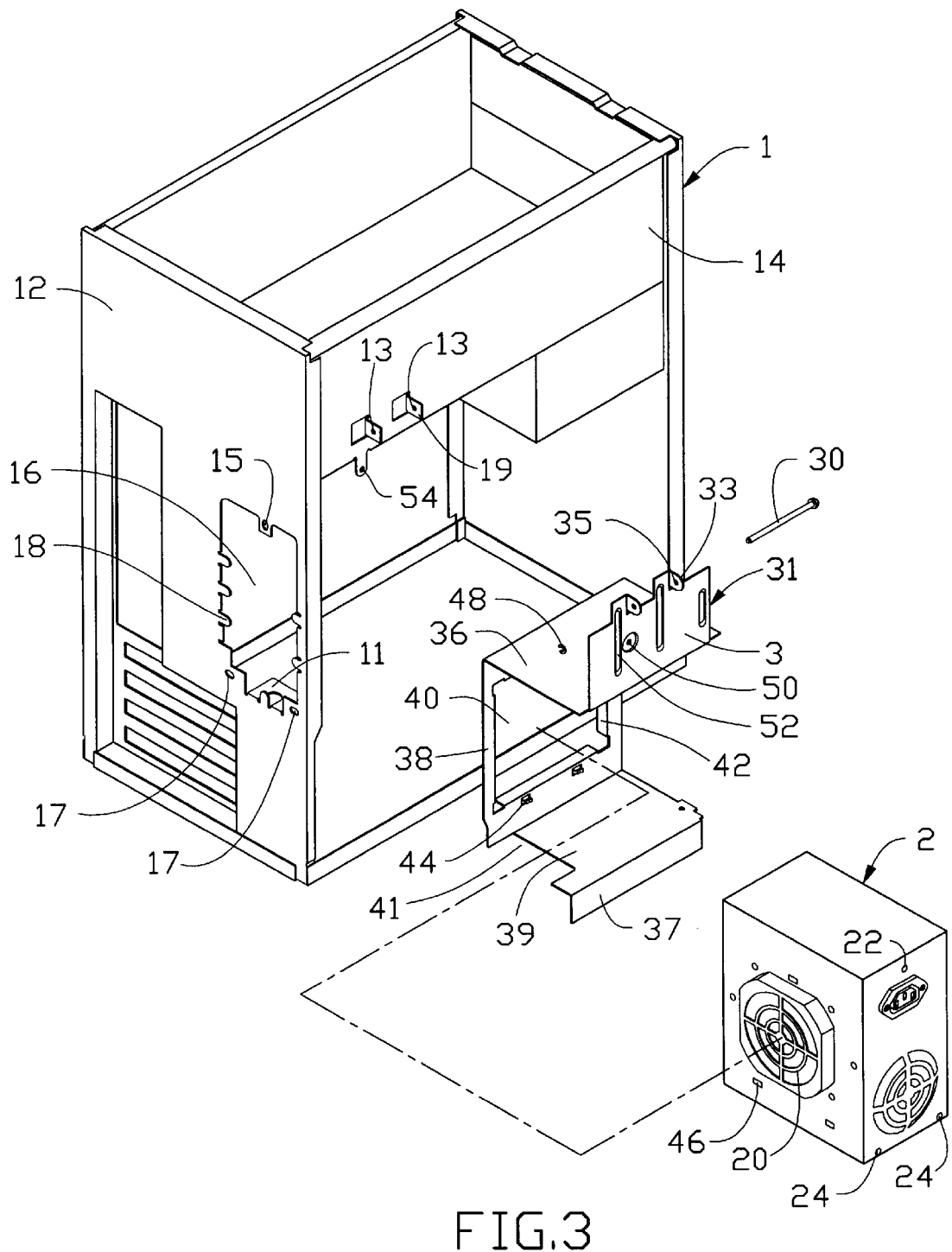
FIG. 3 is an exploded view of FIG. 2.

Referring to the drawings and in particular to FIGS. 2 and 3, a component support frame 3 constructed in accordance with the present invention is adapted to retain a component 2 of an electronic device, such as a power supply of a personal computer, in an enclosure 1. The component support frame 3 comprises a carrier 31 for supporting the power supply 2 and a pivot pin 30 for pivotally attaching the carrier 31 to the enclosure 1 whereby the power supply 2 is allowed to be readily moved between a retracted position where the power supply 2 is completely received in the enclosure 1 as shown in FIG. 2 and an extended position where the power supply 2 is exposed for maintenance and repair purposes as shown in FIG. 6.

The enclosure 1 comprises at least a rear panel 12 and a side panel 14. An opening 16 is defined in the rear panel 12 for partially exposing the power supply 2 and for the extension of a power cable (not shown) therethrough to connect the power supply 2 to an external power source. A plurality of tabs 18 are formed along a periphery of the opening 16 for abutting against the power supply 2 thereby retaining the power supply 2 in position. A support board 11 perpendicularly extending from the periphery of the opening 16 for partially engaging with and supporting the power supply 2. The support board 11 may be stamped from the rear panel 12 of the enclosure 1.

A pair of lugs 19 is formed on the side panel 14 and perpendicularly extends therefrom. The lugs 19 define aligned holes 13 for rotatably receiving the pivot pin 30. A C-clip 48 is used to retain the pivot pin 30 in the holes 13.

Figure 4:
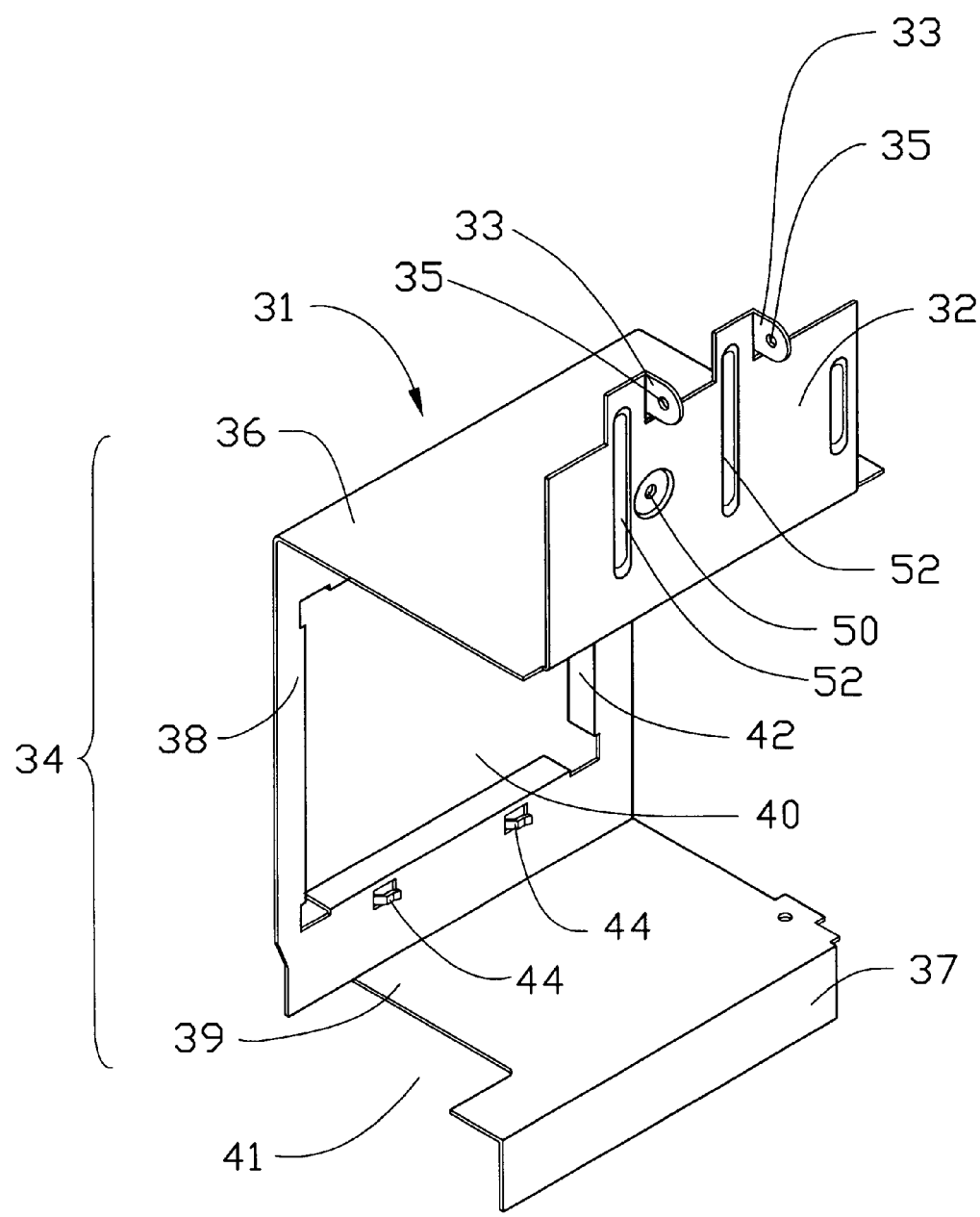
FIG. 4 is a perspective view of the component support frame in accordance with the present invention.
Figure 5:
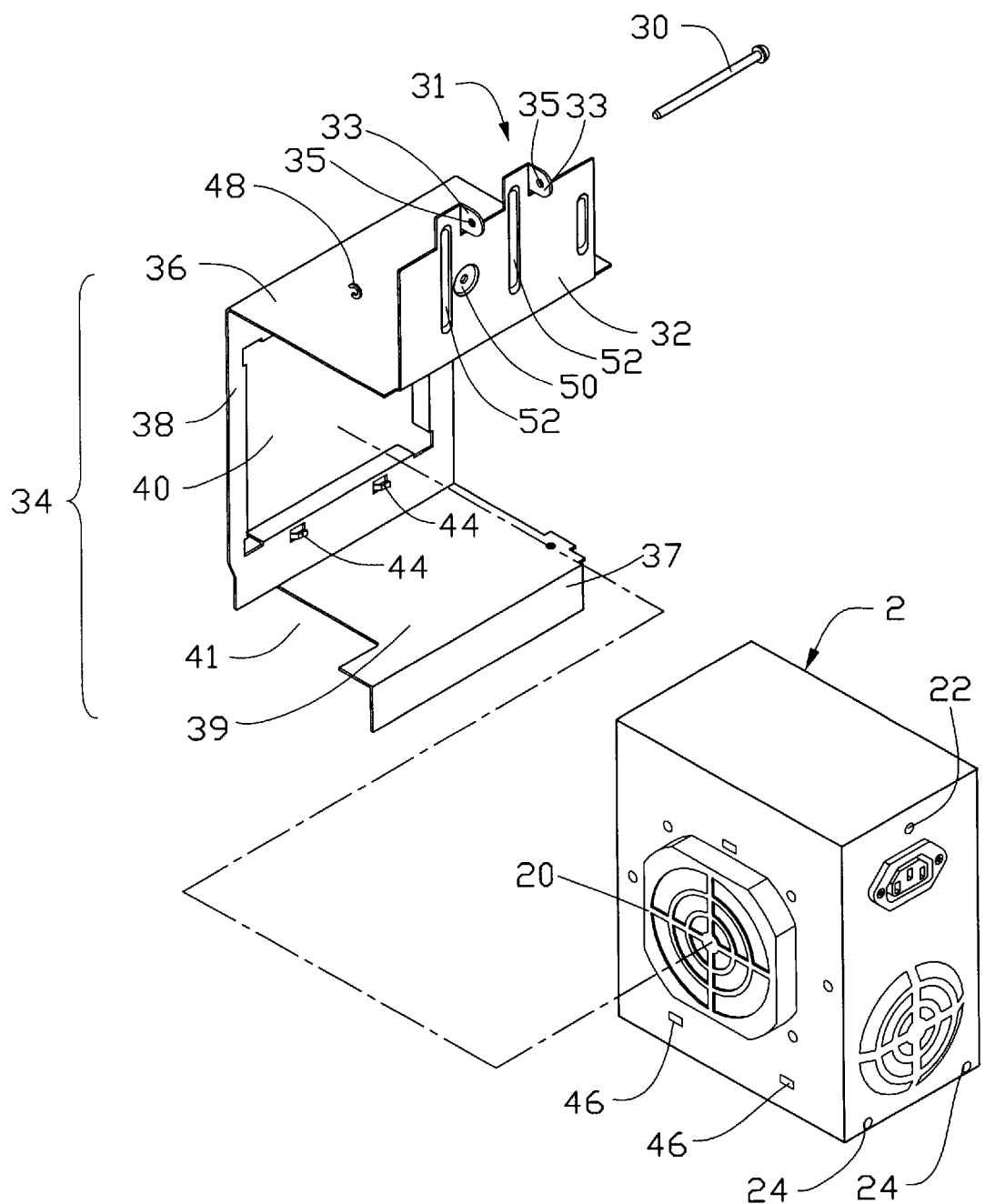
FIG. 5 is a perspective view of the component support frame of the present invention and a power supply to be mounted thereto.
Figure 6:
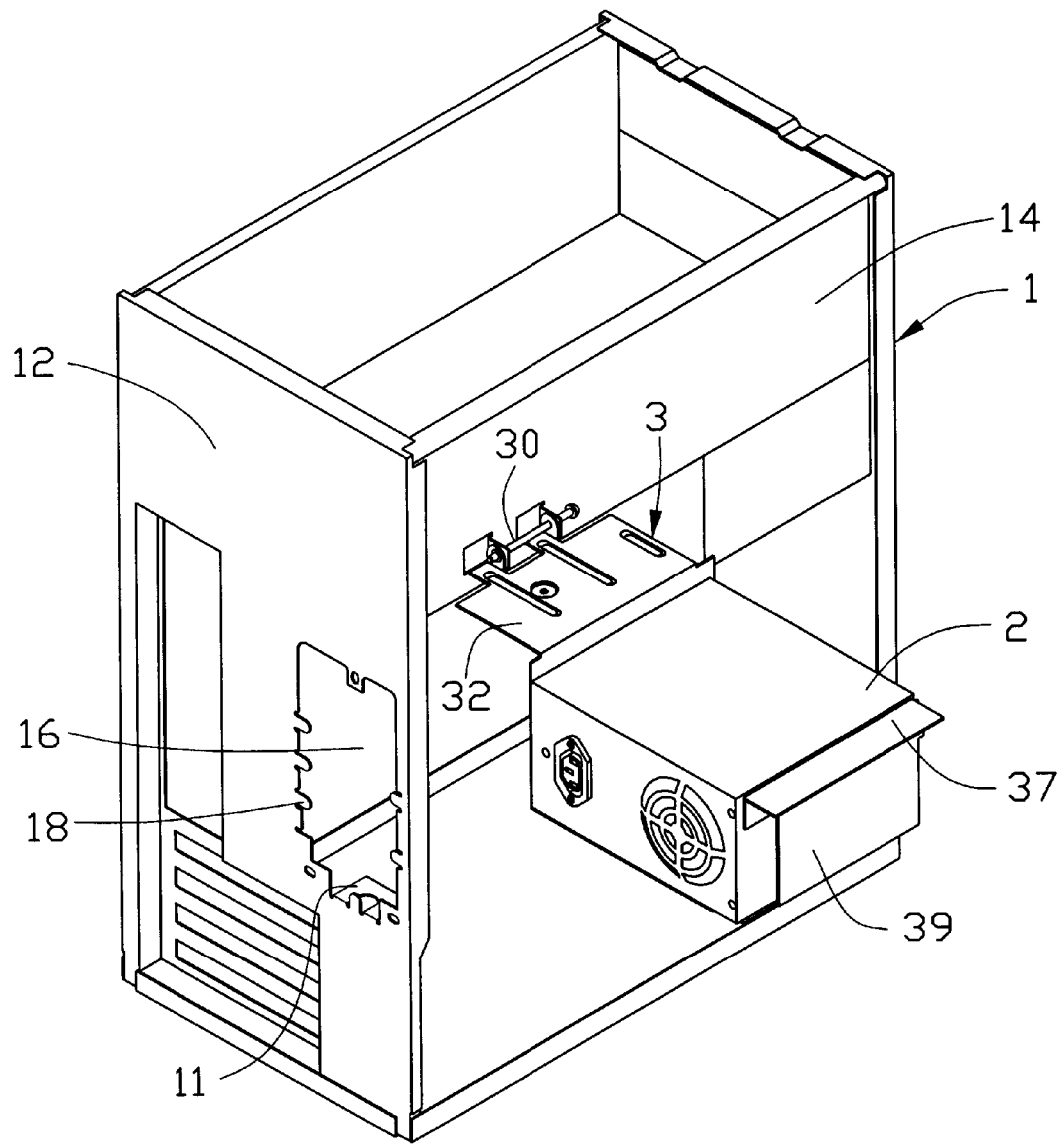
FIG. 6 is similar to FIG. 2 with the component support frame moved to an extended position.

Also referring to FIGS. 4, 5 and 6, the carrier 31 forms a U-shaped receptacle structure 34 comprising a bottom plate 38 and first and second side plates 36, 39. The power supply 2 is received and retained between the bottom plate 38 and the side plates 36, 39. Pawls 44 are formed on the bottom plate 38 for engaging with corresponding openings 46 defined in the power supply 2 thereby fixing the power supply 2 in the carrier 31. In the embodiment illustrated, an opening 40 is defined in the bottom plate 38 with perpendicular flanges 42 formed on a periphery thereof. A ventilation projection 20 extending from the power supply 2 is received in the opening 40 of the bottom plate 38 and abuts against the flanges 42 thereof. The flanges 42 also serve to reinforce the bottom plate 38. The opening 40 and the peripheral flanges 42 may be eliminated if the ventilation projection 20 of the inside fan is omitted from the power supply 2.

The side plates 36, 39 have perpendicular flanges 32, 37 extending from free edges (not labeled) thereof in opposite directions. The flange 32 serving as a connection portion for connecting the carrier 31 to the enclosure 1 forms two spaced lugs 33 substantially corresponding to the lugs 19 of the enclosure 1 with aligned holes 35 defined therein for receiving the pivot pin 30 thereby pivotally attaching the carrier 31 to the side panel 14 of the enclosure 1. If desired, reinforcing ribs 52 may be formed on the flange 32.

A cutout 41 is formed in the second side plate 39 for accommodating the support plate 11 of the enclosure 1 when the carrier 31 is at the retracted position whereby the support plate 11 partially engages and thus supports the power supply 2.

The pivotal connection between the connection portion 32 of the carrier 31 and the enclosure 1 allows the power supply 2 to be readily moved out of the enclosure 1 by pivotally moving the carrier 31 with respect to the enclosure 1 as shown in FIG. 6. The power supply 2 may then be removed from the carrier 31 by disengaging the power supply 2 from the pawls 44 of the carrier 31. The flange 37 of the side plate 39 of the carrier 31 can be easily grasped to move the carrier 31 with respect to the enclosure To ensure firm retention of the power supply 2 in the enclosure 1, corresponding holes 50, 54 are defined in the flange 32 of the carrier 31 and the side panel 14 of the enclosure 1 for receiving bolts (not shown) to secure the carrier 31 to the enclosure 1. Furthermore, holes 15, 17 are defined in the rear plate 12 of the enclosure 1 for receiving bolts (not shown) that engage with screw holes 22, 24 defined in the power supply 2 thereby more securely retaining the power supply 2 in the enclosure 1.

Although the present invention has been described with reference to the preferred embodiment, it is apparent to those skilled in the art that a variety of modifications and changes may be made without departing from the scope of the present invention which is intended to be defined by the appended claims.

What is claimed is:

1. A component support frame adapted to retain a component of an electronic device in an enclosure thereof, comprising:
    a carrier comprising a bottom plate and first and second side plates extending from the bottom plate for receiving the component therebetween, a connection portion extending from the first side plate; and
    a pivot pin pivotally attaching the connection portion of the carrier to the enclosure whereby the carrier is allowed to move between a retracted position where the component is completely received in the enclosure and an extended position where the component is at least partially exposed.

2. The component support frame as claimed in claim 1, wherein the component is a power supply.

3. The component support frame as claimed in claim 1, wherein the side plates of the receptacle portion are substantially perpendicular to the bottom plate.

4. The component support frame as claimed in claim 3, wherein an opening is defined in the bottom plate of the receptacle portion.

5. The component support frame as claimed in claim 4, wherein at least one flange extends from a periphery of the opening of the bottom plate of the receptacle portion.

6. The component support frame as claimed in claim 1, wherein pawls are formed on the bottom plate of the receptacle portion for engaging and retaining the component therein.

7. The component support frame as claimed in claim 1, wherein a cutout is formed in the second side plate for accommodating a support plate extending from the enclosure when the carrier is at the retracted position.

8. The component support frame as claimed in claim 1, wherein a flange extends from an edge of the second side plate of the receptacle for being grasped to move the carrier between the retracted position and the extended position.

9. The component support frame as claimed in claim 1, wherein a hole is defined in the connection portion and adapted to receive a fastener for securing the carrier to the enclosure.

10. The component support frame as claimed in claim 1, wherein the connection portion forms two spaced lugs defining aligned holes for receiving the pivot pin, the pivot pins being rotatably received in holes defined in the enclosure thereby pivotally attaching the component support frame to the enclosure.

11. An arrangement of assembling a power supply within a computer, comprising:
    an enclosure defining at least a rear panel and a side panel;
    a component support frame pivotably attached to the side panel for retainably receiving the power supply therein, said frame defining a U-shaped structure including a bottom plate respectively connecting to two opposite side plates;
    said bottom plate being disposed parallel to the side panel and defining an opening therein in alignment with a fan in the power supply, and
    said rear panel defining another opening for access to the power supply from an exterior and including means for securing the power supply thereto.

12. A component support frame adapted to be mounted in a computer enclosure for retaining at least one electronic component in the computer enclosure, comprising a connection portion pivotally attached to the enclosure and a receptacle position for receiving and retaining the component therein, the receptacle portion extending from the connection portion and comprising a bottom plate and first and second side plates extending from the bottom plate, pawls being formed on the bottom plate for engaging and retaining the component, an opening being defined in the bottom plate for accommodating a projection portion of the component.

13. The component support frame as claimed in claim 12, wherein a hole is defined in the connection portion for receiving a fastener to secure the component support frame to the enclosure.

14. The component support frame as claimed in claim 12, wherein at least one flange extends from a periphery of the opening for abutting against and supporting the component.

* * * * *